United States Patent
Chen et al.

(10) Patent No.: US 9,035,901 B2
(45) Date of Patent: May 19, 2015

(54) CAPACITIVE TOUCH PANEL AND RECOGNITION METHOD AND FABRICATION METHOD THEREOF

(75) Inventors: Te-Mu Chen, Taoyuan County (TW); Hsin-Hao Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 344 days.

(21) Appl. No.: 13/206,162

(22) Filed: Aug. 9, 2011

(65) Prior Publication Data

US 2013/0038562 A1   Feb. 14, 2013

(51) Int. Cl.
 *G06F 3/044* (2006.01)
(52) U.S. Cl.
 CPC . *G06F 3/044* (2013.01); *Y10T 29/43* (2015.01)
(58) Field of Classification Search
 CPC ................................. G06F 3/044; G06F 3/041
 USPC .................................................. 345/173–179
 See application file for complete search history.

(56) References Cited

U.S. PATENT DOCUMENTS

| 2010/0265210 A1* | 10/2010 | Nakanishi et al. ............ 345/174 |
| 2011/0291982 A1* | 12/2011 | Hsieh et al. .................... 345/174 |
| 2012/0131453 A1* | 5/2012 | Pechanec et al. ............. 715/702 |

FOREIGN PATENT DOCUMENTS

| CN | 101866249 A | 10/2010 |
| TW | 201042524 A | 12/2010 |
| TW | M396447 U1 | 1/2011 |
| TW | 201113770 A | 4/2011 |

* cited by examiner

*Primary Examiner* — Kevin Nguyen
*Assistant Examiner* — Cory Almeida
(74) *Attorney, Agent, or Firm* — Birch, Stewart, Kolasch & Birch, LLP

(57) ABSTRACT

A capacitive touch panel and operating and fabrication methods thereof. The capacitive touch panel has a plurality of transmitter electrodes and a plurality of receiver electrodes. An electric field is formed by the receiver electrodes and the powered one of the transmitter electrodes. The changes, caused by the touch of a user, in the electric field are used in touch recognition. The receiver electrodes are all in a fork shape. For one receiver electrode, the teeth are spaced in a first distance. Note that adjacent teeth from different and adjacent electrodes are spaced apart by another distance. The second distance is greater than the first distance.

24 Claims, 4 Drawing Sheets

CAPACITIVE TOUCH PANEL AND RECOGNITION METHOD AND FABRICATION METHOD THEREOF

BACKGROUND OF THE INVENTION

1. Field of the Invention

The present invention relates to capacitive touch panels, and in particular relates to layout design of the receiver electrodes thereof.

2. Description of the Related Art

A touch panel is a common user interface for today's electronic products. Standard technologies include projected capacitive touch sensing.

A projected capacitive touch sensing solution generally requires two sets of electrodes: a first set of electrodes are coupled to a transmitter, which are named transmitter electrodes hereinafter; and a second set of electrodes are coupled to a receiver, which are named receiver electrodes hereinafter. In one general embodiment, the transmitter powers the transmitter electrodes in turn. The powered transmitter electrode builds an electric field with the receiver electrodes of the panel. The changes in the electric field caused by touching by users are used to recognize the touch of a user.

In the field of the art, the sensitivity of touch recognition depends on the layout design of the transmitter electrodes and the receiver electrodes

BRIEF SUMMARY OF THE INVENTION

A capacitive touch panel and recognition and fabrication methods thereof are disclosed.

A capacitive touch panel in accordance with an exemplary embodiment of the invention comprises a first set of electrodes disposed to extend along a first axis of a two-dimensional coordinate and a second set of electrodes disposed to extend along a second axis of the two-dimensional coordinate. The second set of electrodes is spaced apart from the first set of electrodes. Each one of the second set of electrodes contains multiple branches that are spaced apart by a first distance. Two adjacent branches from two different and adjacent electrodes of the second set of electrodes are spaced apart by a second distance. The second distance is longer than the first distance.

As to a recognition method used in the disclosed capacitive touch panel, it comprises the steps as below. Firstly, first data and second data are detected by a first electrode and a second electrode, wherein the first and second electrodes belong to the second set of electrodes and are adjacent to each other. When the first data is greater than a lower limit and the second data is greater than the lower limit and is smaller than an upper limit, it is determined that a touch has occurred and is between the first and the second electrodes.

A portable device in accordance with an exemplary embodiment of the invention comprises a computing system, a display device and a capacitive touch panel. The capacitive touch panel comprises a first set of electrodes disposed to extend along a first axis of a two-dimensional coordinate and a second set of electrodes disposed to extend along a second axis of the two-dimensional coordinate. The second set of electrodes is spaced apart from the first set of electrodes. Each one of the second set of electrodes contains multiple branches that are spaced apart by a first distance. Two adjacent branches from two different and adjacent electrodes of the second set of electrodes are spaced apart by a second distance. The second distance is longer than the first distance.

A capacitive touch panel in accordance with an exemplary embodiment of the invention comprises a plurality of transmitter electrodes disposed to extend along a first axis of a two-dimensional coordinate and a plurality of receiver electrodes disposed to extend along a second axis of the two-dimensional coordinate. Each receiver electrode contains multiple branches that are spaced apart by a first distance. Two adjacent branches from two different and adjacent electrodes of the receiver electrodes are spaced apart by a second distance. The second distance is longer than the first distance.

Another recognition method for the disclosed capacitive touch panel comprises the steps as below. According to the method, the first set of electrodes are driven, and first data and second data are detected from a first electrode and a second electrode that belong to the second set of electrodes and are adjacent to each other. Further, it is determined whether a touch has occurred above the driving electrode of the first set of electrodes, and the location and scope of the touch is determined based on the first data and the second data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
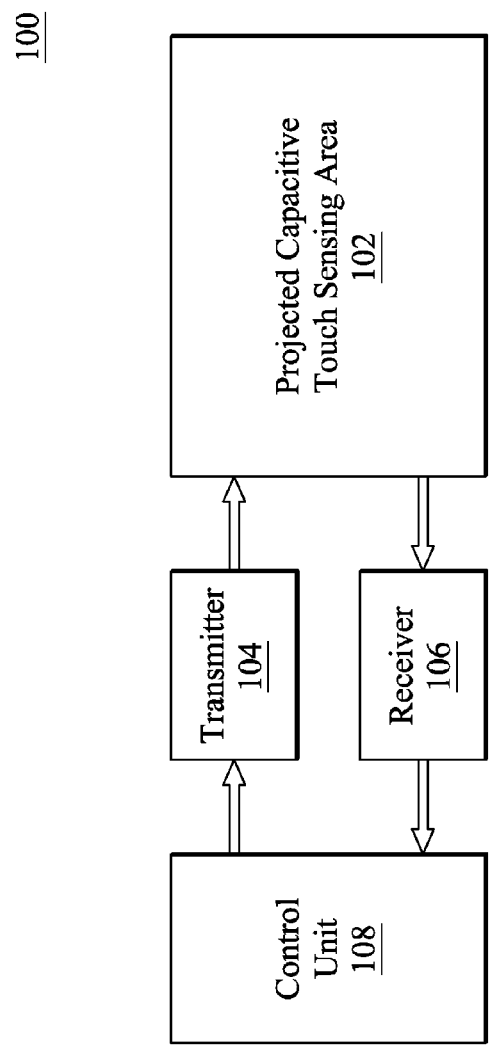
FIG. 1 is a block diagram, depicting a capacitive touch panel in accordance with an exemplary embodiment of the invention.

FIG. 1 is a block diagram, depicting a capacitive touch panel in accordance with an exemplary embodiment of the invention. As conventional capacitive touch sensing technologies, the capacitive touch panel 100 provides a capacitive touch sensing area 102 disposed with a plurality of transmitter electrodes and a plurality of receiver electrodes to connect a transmitter 104 and a receiver 108 of the panel 100. The control unit 108 of the panel 100 is coupled to the transmitter 104 to control the voltages forced onto the transmitter electrodes, wherein data (i.e. electric field intensity) detected by the receiver electrodes may be transferred back to the control unit 108 by the receiver 106 for recognition of the touch of a user.

Figure 2:
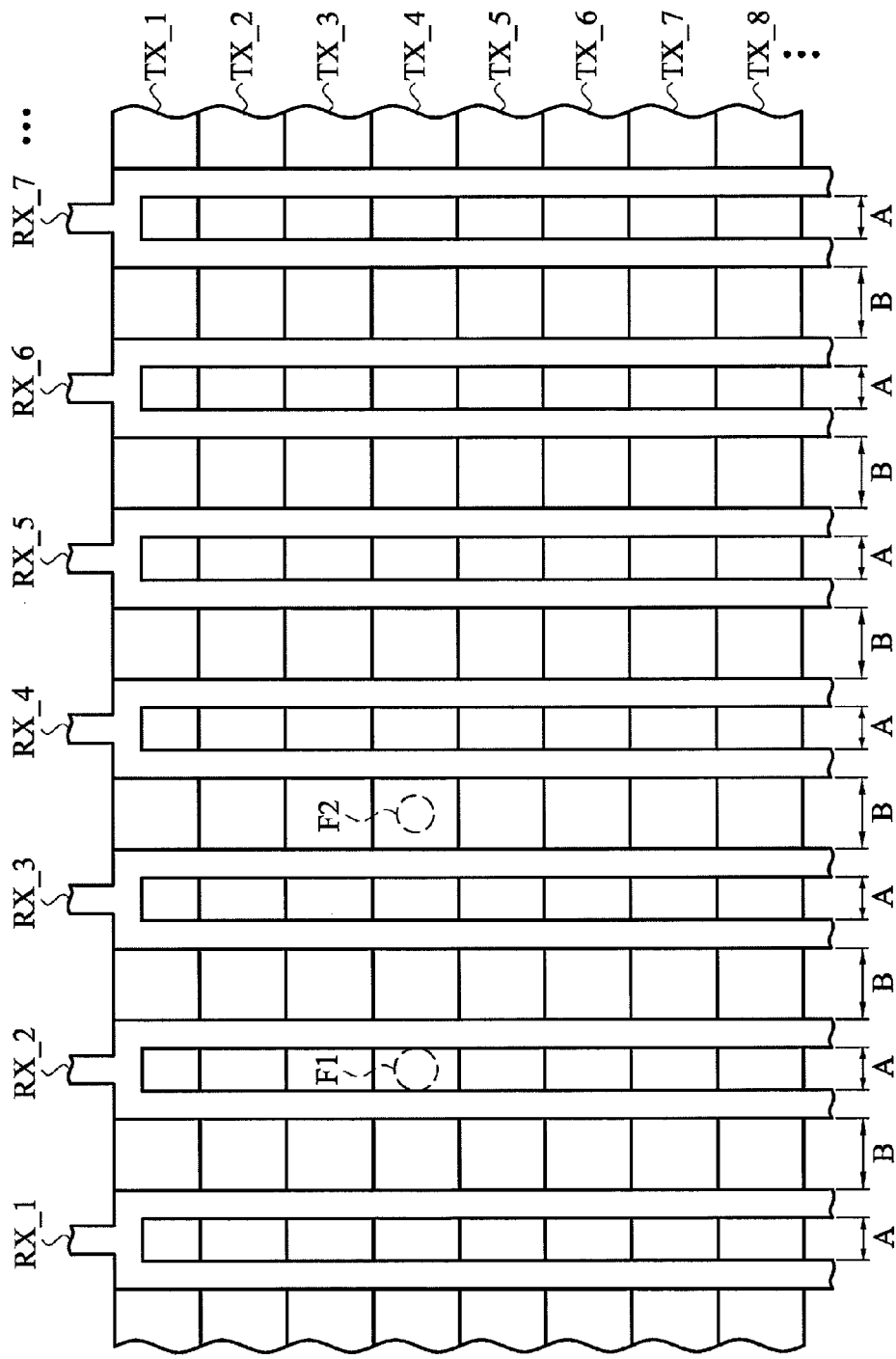
FIG. 2 shows a layout diagram, depicting the layout pattern of a plurality of transmitter electrodes TX_1-TX_7 . . . and a plurality of receiver electrodes RX_1-RX_7 . . . building a projected capacitive touch sensing area 102 of FIG. 1.

FIG. 2 shows a layout diagram, depicting the capacitive touch sensing area 102 of FIG. 1. In the capacitive touch sensing area 102, a first set of electrodes TX_1-TX_7 . . . are disposed to extend along a first axis (e.g. x-axis) of a two-dimensional coordinate. The first set of electrodes TX_1-TX_7 . . . depicted in the figure may be used as an exemplary layout pattern for a plurality of transmitter electrodes and named TX_1-TX_7 . . . . In the capacitive touch sensing area 102, a second set of electrodes RX_1-RX_7 . . . may be disposed to extend along a second axis (e.g. y-axis) of the two-dimensional coordinate. The angle between the two axes may be 90 degrees. The second set of electrodes RX_1-RX_7 . . . depicted in the figure may be used as an exemplary layout pattern of a plurality of receiver electrodes and named RX_1-RX_7 . . . . The first set of electrodes TX_1-TX_7 . . . and the second set of electrodes RX_1-RX_7 . . . are all transparent conducting materials, such as Indium Tin Oxide (ITO). A sensing structure is build by the intersection of the first and the second sets of electrodes TX_1-TX_7 . . . and RX_1-RX_7 . . . to detect the changes in the electric field caused by at least one touch action. The first set of electrodes TX_1-TX_7 . . . is spaced apart from the second set of electrodes RX_1-RX_7 . . . vertically by dielectric materials (i.e. spaced apart, upper and lower, along a normal vector facing outward from the paper).

As shown, in the second set of electrodes RX_1-RX_7 . . . , each electrode has multiple branches, e.g., each electrode has two branches. The shape of every receiver electrode RX_1-RX_7 . . . is fork shaped. Although the embodiment shown in the figure implements the fork-shaped electrode by the pattern of a tuning fork, it is not intended to limit the scope of the invention. In other exemplary embodiments, the fork-shaped electrode may contain more teeth, and, for example, be trident shaped or have even more teeth.

In the disclosure, the layout of the fork-shaped receiver electrodes is specially designed. As for the second set of electrodes, the branches of the same electrode are spaced apart by a first distance, while two adjacent branches from two different and adjacent electrodes of the second set of electrodes are spaced apart by a second distance. In the exemplary embodiment of FIG. 2, the two teeth of the tuning fork pattern are spaced apart by a first distance A while the adjacent teeth from different and adjacent tuning fork patterns are spaced apart by a second distance B. The second distance B is greater than the first distance A. In some exemplary embodiments, the second distance B is 1.5-2 times the length of the first distance A. In other exemplary embodiments wherein each fork structure contains three or more teeth, the same layout rule is used. In conclusion, the teeth of the same receiver electrode are spaced apart by a first distance, and adjacent two teeth from two different and adjacent receiver electrodes are spaced apart by a second distance, where the second distance is longer than the first distance.

Figure 3:
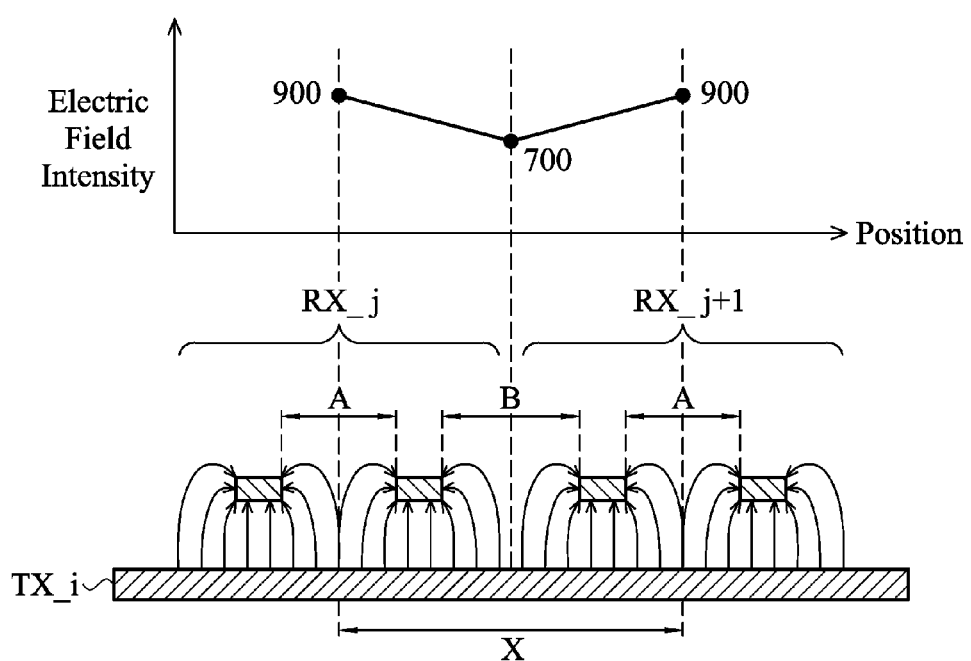
FIG. 3 is a cross diagram of the layout pattern of FIG. 2, wherein a transmitter electrode TX_j and two receiver electrodes RX_j and RX_j+1 are shown.

FIG. 3 is a cross diagram, partially depicting the layout pattern of FIG. 2. As shown, there is one transmitter electrode TX_j and two receiver electrodes RX_j and RX_j+1. The distance from the center of the receiver electrode RX_j to the center of the receiver electrode RX_j+1 is x. As disclosed by FIG. 2, the two teeth of the receiver electrode RX_j are spaced apart by the first distance A, the two teeth of the receiver electrode RX_j+1 are spaced apart by the first distance A as well, and, the adjacent two teeth of the two adjacent receiver electrodes RX_j and RX_j+1 are spaced apart by the second distance B. In FIG. 3, the electric field built between the transmitted electrode TX_j and the receiver electrodes RX_j and RX_j+1 when a voltage is forced to the transmitter electrode TX_j is shown.

Figure 4A:
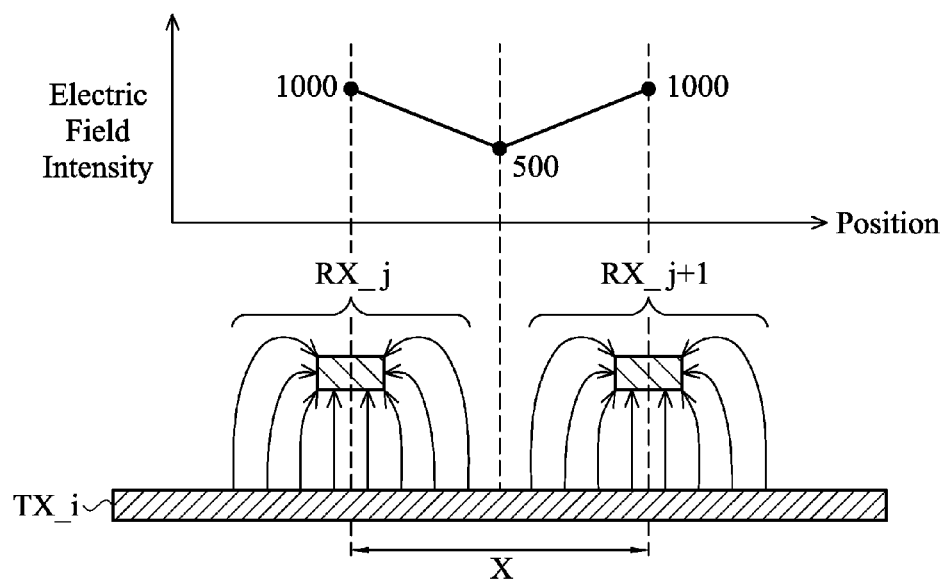
FIG. 4A and FIG. 4B show cross diagrams of two conventional layout patterns, wherein the condition of the electric field is depicted.
Figure 4B:
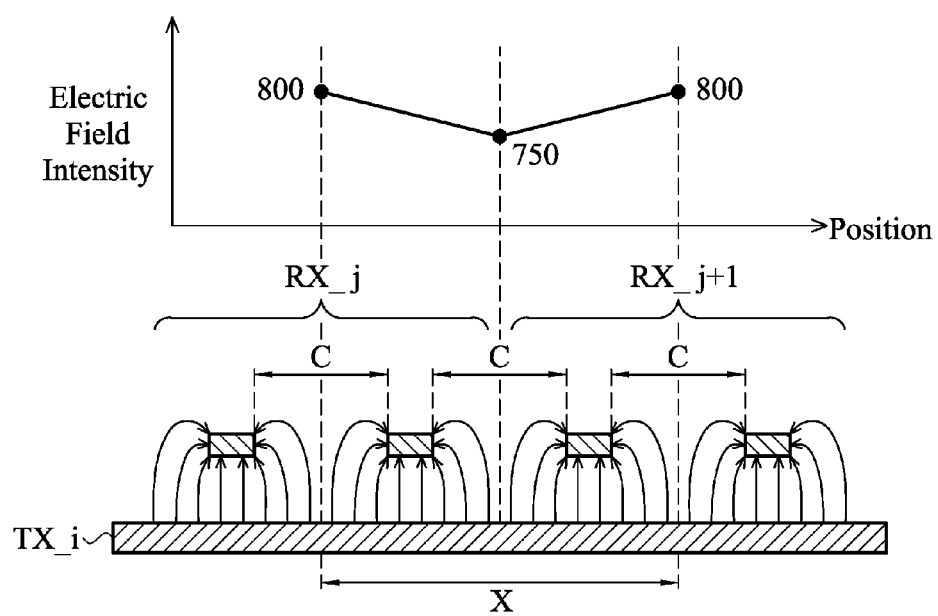

Furthermore, in comparison with that taught in FIG. 3, the cross sections and electric fields of FIG. 4A and FIG. 4B relate to two conventional layout technologies. In comparison with FIG. 3, FIG. 4A and FIG. 4B also show one transmitter electrode TX_j and two receiver electrodes RX_j and RX_j+1, and, the distance from the center of the receiver electrode RX_j to the center of the receiver electrode RX_j+1 is x.

Referring to FIG. 4A, each receiver electrode is implemented by one single strip rather than by a fork structure. Referring to FIG. 4B, though each receiver electrode is in a fork shape, the two teeth of the receiver electrode RX_j are spaced apart by a distance C which is the same as the distance between the adjacent two teeth of the two adjacent receiver electrodes RX_j and RX_j+1. The structure of FIG. 4B is hereinafter referred to as a symmetrical fork-shaped layout pattern, in comparison with the asymmetrical fork-shaped layout pattern of the disclosure.

Referring to FIGS. 3, 4A and 4B, the difference between the layout design of the disclosure and the layout design of conventional techniques are discussed below.

Comparing FIG. 3 with FIG. 4A, the electric field generated by the fork-shaped electrodes is denser than that generated by the strip-shaped electrodes. The uniform electric field generated by the fork-shaped layout pattern considerably improves the recognition of the drawing of a straight line. For example, as a user draws a line with his forefinger or by a stylus, the layout design of the disclosure helps to more precisely recognize the drawing of the line in comparison with the conventional layout design of FIG. 4A. The feature of the line may be completely recognized by the disclosure.

Referring to the layout design of FIG. 3, when the user's finger slides from above the center of the two teeth of the receiver electrode RX_j to above the center between the two receiver electrodes RX_j and RX_j+1 to above the center of the two teeth of the receiver electrode RX_j+1, the detected intensity of the electric field starts from 900 intensity units (i.e. the electric field intensity detected by the receiver electrode RX_j when the user's finger is above the center of the two teeth of the receiver electrode RX_j), and then steadily falls to 700 intensity units (i.e. the electric field intensity that the receiver electrodes RX_j or RX_j+1 individually detected when the user's finger is above the center between the receiver electrodes RX_j and RX_j+1), and then steadily rises back to 900 intensity units (i.e. the electric field intensity detected by the receiver electrode RX_j+1 when the user's finger is above the electrode RX_j+1). Referring to the layout design of FIG. 4A, when the user's finger slides from above the electrode RX_j to above the center between the electrodes RX_j and RX_j+1 and then to above the electrode RX_j+1, the detected electric field intensity starts from 1000 intensity units (i.e. the electric field intensity detected by the receiver electrode RX_j when the user's finger is above the electrode RX_j), and then sharply falls to 500 intensity units (i.e. the electric field intensity that the receiver electrodes RX_j or RX_j+1 individually detected when the user's finger is above the center between the receiver electrodes RX_j and RX_j+1) and then sharply rises back to 1000 intensity units (i.e. the electric field intensity detected by the receiver electrode RX_j+1 when the user's finger is above the electrode RX_j+1). Thus, when an identical density, in comparison with FIG. 3, of the receiver electrodes (i.e. receiver electrodes are spaced in the same distance x) is used in FIG. 4A, the electric field intensity detected by the receiver 106 changes significantly and therefore jitter occurs on the detected signals and result in linear distortion to erroneously recognize a straight line as a curved line. The layout design of the disclosure is suitable for recognition of a small touch area.

Comparing FIG. 3 with FIG. 4B, although the electric field provided by the asymmetrical fork-shaped layout pattern of FIG. 3 is not as uniform as that provided by the symmetrical fork-shaped layout pattern of FIG. 4B (e.g., in comparison with the electric field intensity 900, 700 and 900 detected by the pattern of FIG. 3, the electric field intensity detected by the pattern FIG. 4B for the same touch action is 800, 750 and 800, more uniform than those of FIG. 3), the slightly uneven electric field helps recognition of a large-area touch (for example, the user may touch the panel by his thumb), or multiple touches within a limited area (for example, when sliding two figures close together).

Referring to the layout patterns of FIG. 3 and FIG. 4B which have identical densities of receiver electrodes, below, discusses the electric field intensity detected by the receiver electrodes when a user slides his thumb over the panel.

Referring to the layout pattern of FIG. 3, when the user's thumb touches an area covering from the center between the two teeth of the electrode RX_j to the center between the two electrodes RX_j and RX_j+1, the electric field intensity detected by the electrodes RX_j and RX_j_1 are 900 and 700 intensity units, respectively. For the same contact area (covering from the center between the two teeth of the electrode RX_j to the center between the two electrodes RX_j and RX_j+1), when the layout pattern of FIG. 4B is used, the electric field intensity detected by the electrodes RX_j and RX_j+1 are 800 and 750 intensity units, respectively. In the example of FIG. 3, because the electric field intensity 900 and 700 intensity units detected by the electrodes RX_j and RX_j+1 have a difference of up to 200 intensity units, it is determined that the touch covers from the center between the two teeth of the electrode RX_j to the center between the electrodes RX_j and RX_j+1. To detect the same touch by the panel designed according to FIG. 4B, the electrode RX_j (sensing 800 intensity units) and the electrode RX_j+1 (sensing 750 intensity units), however, only provide an electric field intensity difference of 50 intensity units which is within the permissible error range. It is difficult to determine that the touch of the thumb is: 1) covering from the center of the two teeth of the electrode RX_j to the center between the electrodes RX_j and RX_j+1; or 2) covering from the center between the two teeth of the electrode RX_j to the center between the two teeth of the electrode RX_j+1. In comparison with FIG. 4B, the layout pattern of FIG. 3 results in more accurate recognition of a large-area touch.

For the layout design of FIG. 3 and FIG. 4B which have identical distribution densities of receiver electrodes, the electric filed intensity detected when multiple touches occur within a small area is discussed below.

For example, as shown in FIG. 2, distinct touches occurring on position F1 and position F2 are within a small area. The user may use one finger to touch the panel on the center between the two teeth of the electrode RX_2 and use another finger to touch the panel on the center between the electrodes RX_3 and RX_4. According to the layout pattern of FIG. 3, the electric field intensity detected by the electrodes RX_2, RX_3 and RX_4 may be 900, 700 and 700 intensity units, respectively. According to the layout pattern of FIG. 4B, if the same multiple touches occur on the panel, the electric field intensity detected by the electrodes RX_2, RX_3 and RX_4 may be 800, 750 and 750 intensity units, respectively, having an intensity difference of 50 intensity units, within the permissible error range. According to the layout design of FIG. 3, the intensity difference provided by the detected electric field intensity 900, 700 and 700 (detected by the electrodes RX_2, RX_3 and RX_4, respectively) is 200 intensity units and is obvious to determine that multiple touches occur on the panel—one touch occurs on the center between the two teeth of the electrode RX_2 while another touch occurs on the center between the electrodes RX_3 and RX_4. However, according to the layout design of FIG. 4B, the intensity difference provided by the electric field intensity detected by the electrodes RX_2, RX_3 and RX_4 are very small and are within the permissible error range. The controller may treat the electric field intensity detected by the three electrodes the same, and misjudge the touch action as a single large-area touch. In other words, according to the layout design of FIG. 4B, it is difficult for the controller to identify the difference between a single large-area touch and multiple touches within a limited area.

The layout design of the disclosure has outstanding performance to recognize a large area touch as well as multiple touches within a small area.

A transparent conductive thin film (e.g. ITO) may be used in the fabrication of the transmitter electrodes and the receiver electrodes. Poly Ethylene Terephthalate (PET) may be placed between the receiver electrodes and the transmitter electrodes.

Note that the transmitter electrodes are not limited to be disposed row by row as shown in FIG. 2. Transmitter electrodes designed in a different shape or layout may be used with the receiver electrodes of the disclosure. A multi-touch recognition method for the capacitive touch panel of the disclosure is specifically discussed in this paragraph and may be performed by the controller 108 of FIG. 1. The touch recognition method includes the steps discussed below. Firstly, the controller 108 may drive electrode TX_j, one of the first set of electrodes TX_1-TX_7 . . . . At that time, if the second set of electrodes RX_1-RX_7 . . . detects a touch, the controller 108 determines that the touch occurs on the electrode TX_j of the first set of electrodes TX_1-TX_7 . . . . Then, the controller 108 may obtain first data and second data from adjacent first and second electrodes RX_j and RX_j+1 of the second set of electrodes RX_1-RX_7 . . . . If the first data is greater than a lower limit and the second data is greater than the lower limit and is lower than an upper limit, the controller 108 determines that the touch occurs between the first and second electrodes RX_j and RX_j+1. According to the layout pattern of FIG. 3, the electric field intensity that the electrode RX_j detects when the user's forefinger touches an area above the center between the two teeth of the electrode RX_j is 900. The controller 108 may set the upper limit as 900 intensity units. Note that the electric field intensity detected by the electrode RX_j may be interfered with by noise so that when the user's forefinger touches an area above the center between the two teeth of the electrode RX_j, the intensity value detected by the electrode RX_j may be a bit lower than 900 intensity units. To deal with this problem, the upper limit may be defined according a tolerance upper limit, i.e., the upper limit may be 850 intensity units rather than 900 intensity units. Further, because the electric field intensity that the first and second electrodes RX_j and RX_j+1 individually detects when the user's forefinger touches an area above the center between the first and second electrodes RX_j and RX_j+1 is 700 intensity units, the controller 108 may set the lower limit to be 700 intensity units.

When the controller 108 obtains that the first data is greater than the upper limit, it may be determined that the touch occurs between the first electrode RX_j and the second electrode RX_j+1 and extends to the first electrode RX_j. The controller 108 may further obtain a third data from a third electrode RX_j+2 that belongs to the second set of electrodes RX_1-RX_7 . . . and is adjacent to the second electrode RX_j+1. When the first data is greater than the lower limit, and the second data is between the lower and the upper limits and the third data is greater than the lower limit, the controller 108 may determine that another touch, different from the touch occurring between the first electrode RX_j and the second electrode RX_j+1, has occurred between the second electrode RX_j+1 and the third electrode RX_j+2.

To summarize, according to the disclosed method, when first data and second data obtained from two adjacent receiver electrodes both respond to a touch action and the first and second data are both lower than an tolerance upper limit calculated from an upper data (data detected by a receiver electrode when a touch has occurred just above the receiver electrode), it is determined that a touch has occurred between the two adjacent receiver electrodes. Referring to FIG. 2, by the disclosed method, a touch occurring on the position F2 is recognized from a touch on the position F1. Recognition of multiple touches within a small area is achieved. According to the disclosed method, multiple touches within a small area are no longer erroneously regarded as one single large-area touch.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A capacitive touch panel, comprising:
   a first set of electrodes, disposed to extend along a first axis of a two-dimensional coordinate; and
   a second set of electrodes, disposed to extend along a second axis of the two-dimensional coordinate and spaced apart from the first set of electrodes,
   wherein each one of the second set of electrodes contains branches which are spaced apart by a first distance, and adjacent two branches from two different and adjacent electrodes of the second set of electrodes are spaced apart by a second distance longer than the first distance, and the second distance is 1.5 to 2 times the length of the first distance, and
   wherein the branches are not connected with each other at one end of the second set of electrodes and the branches are disposed to extend along the second axis.

2. The capacitive touch panel as claimed in claim 1, wherein a detection structure is built by intersection of the first and second sets of electrodes to detect electric field changes caused by at least one touch.

3. The capacitive touch panel as claimed in claim 1, wherein the number of branches contained in each of the second set of electrodes is 2.

4. The capacitive touch panel as claimed in claim 1, wherein the first and second sets of electrodes are transparent conductive materials.

5. The capacitive touch panel as claimed in claim 1, wherein the first set of electrodes is spaced apart from the second set of electrodes vertically by dielectric materials.

6. The capacitive touch panel as claimed in claim 1, further comprising a control unit driving voltages to the first set of electrodes and processing data detected by the second set of electrodes.

7. A recognition method used in a capacitive touch panel, the capacitive touch panel having a first set of electrodes disposed to extend along a first axis of a two-dimensional coordinate and a second set of electrodes disposed to extend along a second axis of the two-dimensional coordinate, wherein each one of the second set of electrodes contains branches which are spaced apart by a first distance while adjacent two branches from two different and adjacent electrodes of the second set of electrodes are spaced apart by a second distance which is 1.5 to 2 times the length of the first distance, and, the recognition method comprising:
   obtaining first data and second data from adjacent first and second electrodes which belong to the second set of electrodes; and
   determining that a touch has occurred between the first and second electrodes when the first data is greater than a lower limit and the second data is greater than the lower limit and is lower than an upper limit,
   wherein the branches are not connected with each other at one end of the second set of electrodes and the branches are disposed to extend along the second axis.

8. The recognition method as claimed in claim 7, wherein data detected by one of the second set of electrodes when a touch has occurred just above the one of the second set of electrodes is regarded as the upper limit.

9. The recognition method as claimed in claim 7, wherein a tolerance upper limit calculated from data detected by one of the second set of electrodes when a touch has occurred just above the one of the second set of electrodes is regarded as the upper limit.

10. The recognition method as claimed in claim 7, wherein the lower limit is set to a minimum value that adjacent two of the second set of electrodes detects when a touch has occurred between the adjacent two of the second set of electrodes.

11. The recognition method as claimed in claim 7, further comprising:
    driving one electrode of the first set of electrodes; and
    determining that the touch occurs on the driven one of the first set of electrodes.

12. The recognition method as claimed in claim 7, further comprising:
    determining that the touch occurs between the first and second electrodes and extends to the first electrode when the first data is greater than the upper limit.

13. The recognition method as claimed in claim 7, further comprising:
    using a third electrode which belongs to the second set of electrodes and is adjacent to the second electrode to obtain a third data; and
    determining that another touch occurs between the second electrode and the third electrode when the first data is greater than the lower limit, the second data is between the lower limit and the upper limit and the third data is greater than the lower limit, and recognizing the another touch from the touch occurring between the first and second electrodes.

14. A capacitive touch panel, comprising:
    a plurality of transmitter electrodes, disposed to extend along a first axis of a two-dimensional coordinate; and
    a plurality of receiver electrodes, disposed to extend along a second axis of the two-dimensional coordinate,
    wherein each one of the plurality of receiver electrodes contains branches that are spaced apart by a first distance, and any adjacent two branches from two different and adjacent electrodes of the plurality of receiver electrodes are space apart by a second distance which is 1.5 to 2 times the length of the first distance, and
    wherein the branches are not connected with each other at one end of the second set of electrodes and the branches are disposed to extend along the second axis.

15. A portable device having a processing system, a display device and a capacitive touch panel, wherein the capacitive touch panel comprises:
    a first set of electrodes, disposed to extend along a first axis of a two-dimensional coordinate; and a second set of electrodes, disposed to extend along a second axis of the two-dimensional coordinate and spaced apart from the first set of electrodes, wherein each one of the second set of electrodes contains branches that are spaced apart by a first distance, and any two adjacent branches from two different and adjacent electrodes of the second set of electrodes are spaced apart by a second distance longer than the first distance, and the second distance is 1.5 to 2 times the length of the first distance, and wherein the branches are not connected with each other at one end of the second set of electrodes and the branches are disposed to extend along the second axis.

16. A fabrication method for a capacitive touch panel, comprising:

disposing a first set of electrodes to extend along a first axis of a two-dimensional coordinate; and disposing a second set of electrodes to extend along a second axis of the two-dimensional coordinate and spacing the second set of electrodes apart from the first set of electrodes, wherein each one of the second set of electrodes contains branches that are spaced apart by a first distance, and any two adjacent branches from two different and adjacent electrodes of the second set of electrodes are spaced apart by a second distance longer than the first distance, and the second distance is 1.5 to 2 times the length of the first distance, and wherein the branches are not connected with each other at one end of the second set of electrodes and the branches are disposed to extend along the second axis.

17. The fabrication method as claimed in claim 16, wherein a detection structure is built by intersection of the first and second sets of electrodes to detect electric field changes caused by at least one touch.

18. The fabrication method as claimed in claim 16, wherein the number of branches contained in each of the second set of electrodes is 2.

19. The fabrication method as claimed in claim 16, wherein the first and second sets of electrodes are transparent conductive materials.

20. The fabrication method as claimed in claim 16, wherein the first set of electrodes is spaced apart from the second set of electrodes vertically by dielectric materials.

21. A recognition method used in a capacitive touch panel, the capacitive touch panel comprising a first set of electrodes disposed to extend along a first axis of a two-dimensional coordinate and a second set of electrodes disposed to extend along a second axis of the two-dimensional coordinate, wherein each one of the second set of electrodes contains branches which are spaced apart by a first distance while adjacent two branches from two different and adjacent electrodes of the second set of electrodes are spaced apart by a second distance which is 1.5 to 2 times the length of the first distance, and, the recognition method comprising:

driving one electrode of the first set of electrodes;

using a first electrode and a second electrode which belongs to the second set of electrodes and are adjacent to each other to detect a first data and a second data;

determining that a touch has occurred on the driven one of the first set of electrodes based on the detected first and second data;

determining a location and a scope of the touch according to the first and second data, wherein the branches are not connected with each other at one end of the second set of electrodes and the branches are disposed to extend along the second axis.

22. The recognition method as claimed in claim 21, further comprising:

determining that the touch occurs between the first electrode and the second electrode when the first data and the second data both are lower than an upper limit and greater than a lower limit.

23. The recognition method as claimed in claim 21, further comprising:

determining that the touch occurs on the first electrode and extends to between the first and second electrodes when the first data is greater than an upper limit and the second data is between a lower limit and the upper limit.

24. The recognition method as claimed in claim 21, further comprising:

using a third electrode that belongs to the second set of electrodes and is adjacent to the second electrode to detect a third data; and determining that another touch occurs between the second electrode and the third electrode when the first data is greater than a lower limit, the second data is lower than an upper limit and the third data is greater than the lower limit, and recognizing the another touch from the touch previously recognized.

* * * * *